(12) United States Patent
Bradford

(10) Patent No.: US 6,395,125 B1
(45) Date of Patent: May 28, 2002

(54) PROCESS FOR MAKING A PICTURE FRAME

(76) Inventor: Richard N. Bradford, 578 North St., Longwood, FL (US) 32750

( * ) Notice: Subject to any disclaimer, the term of this patent is extended or adjusted under 35 U.S.C. 154(b) by 61 days.

(21) Appl. No.: 09/689,972

(22) Filed: Oct. 13, 2000

(51) Int. Cl.⁷ .............................................. B32B 31/00
(52) U.S. Cl. ...................... 156/277; 156/223; 156/250; 156/258; 156/272.8; 156/275.5; 40/771; 40/776; 40/798
(58) Field of Search ........................ 156/63, 108, 223, 156/258, 250, 272.2, 272.8, 273.7, 275.5, 275.7; 40/737, 765, 767, 771, 774, 776, 798

(56) References Cited

U.S. PATENT DOCUMENTS

| | | | | |
|---|---|---|---|---|
| 224,973 A | * | 2/1880 | Wallis | 40/737 |
| 2,942,368 A | * | 6/1960 | Gale | 40/772 |
| 4,934,078 A | * | 6/1990 | Sloot | 40/754 |
| 5,323,551 A | * | 6/1994 | Lovison et al. | 40/745 |

FOREIGN PATENT DOCUMENTS

GB   2231551 A   * 11/1990

* cited by examiner

Primary Examiner—Michael W. Ball
Assistant Examiner—John T. Haran
(74) Attorney, Agent, or Firm—William M. Hobby, III

(57) ABSTRACT

A process for making a picture frame includes the step of printing border art and registration marks on a piece of transparent sheet material, such as vinyl or polycarbonate plastic sheet material, while leaving a center window portion transparent. Then making a laser cut path in a computer digital file for the printed transparent sheet material for cutting the outside path of the border art and then coating an adhesive onto the transparent sheet material to cover the printed artwork and transparent center window. The process includes attaching the transparent sheet material having the printed border surrounding a transparent center window onto a transparent polymer picture frame member, cutting the transparent sheet of material along the computer stored cutout path on the outer edge of the border art to form an outer border on the transparent material and transparent picture frame member. The transparent polymer sheet is heated and folded to form a backing for the picture frame. The process can also utilize a coating of ultraviolet activated adhesive applied over the printed transparent sheet, then passing the polymer sheet and transparent sheet through a pair of rollers for removing air bubbles and then directing ultraviolet light through the polymer sheet onto the adhesive to activate the adhesive. The process can also include attaching a frame easel or support to the back of the picture frame.

11 Claims, 2 Drawing Sheets

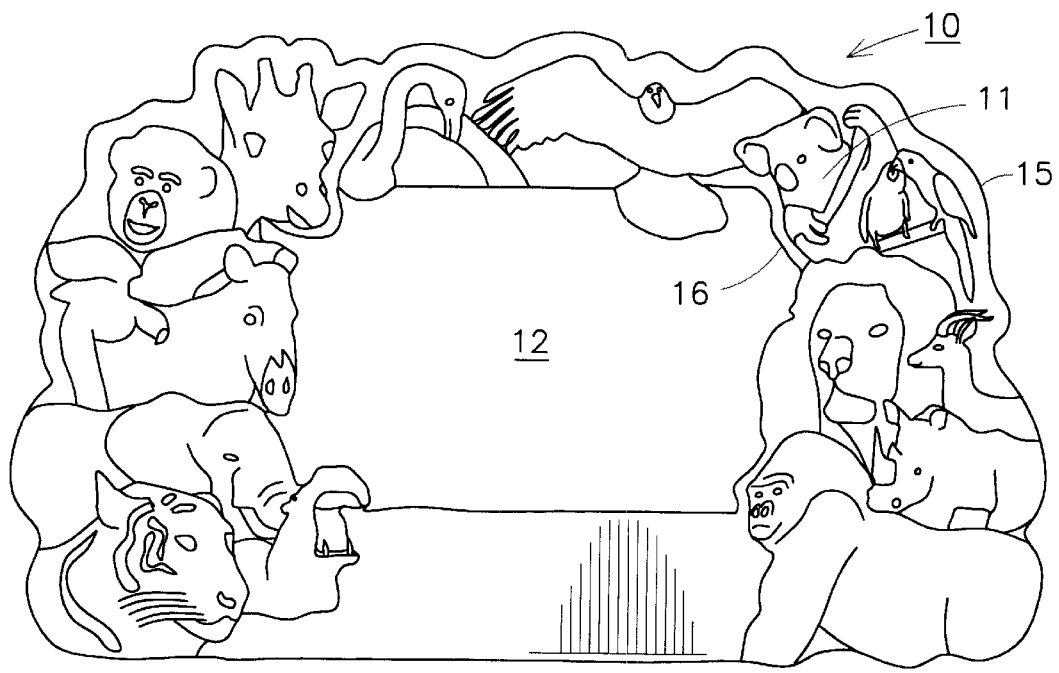
FIG. 1
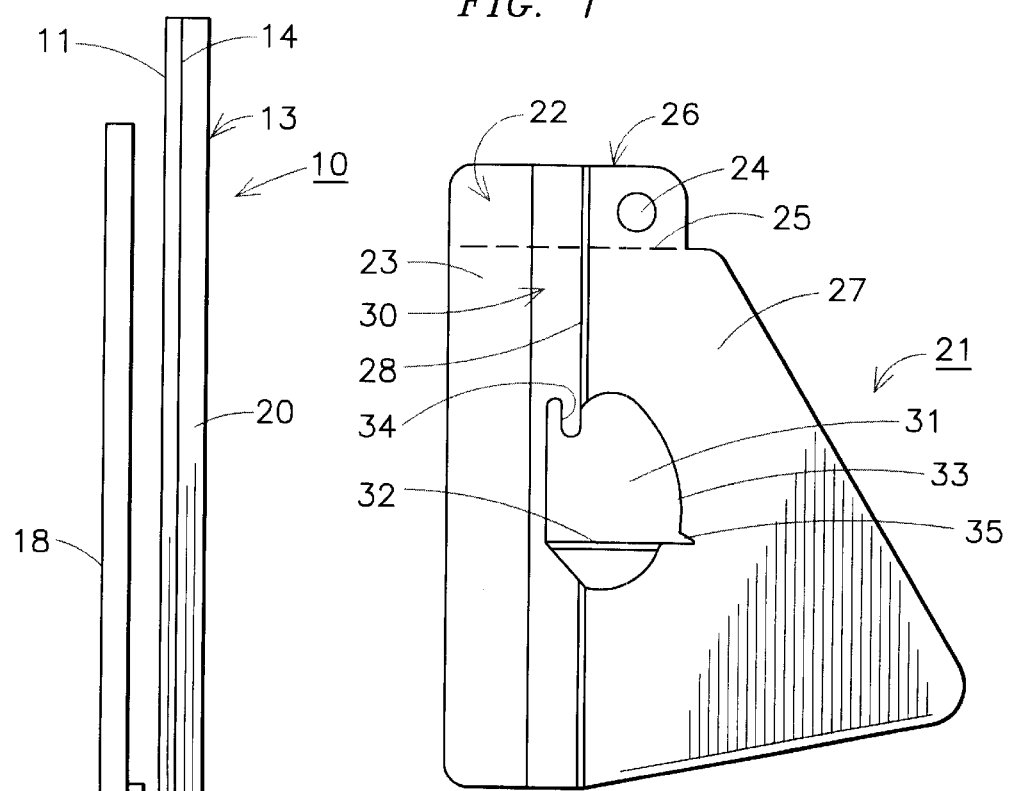
FIG. 2
FIG. 4

PROCESS FOR MAKING A PICTURE FRAME

BACKGROUND OF THE INVENTION

The present invention relates to a process of making a picture frame and especially to a process of making a clear polymer picture frame having a decorative border around a center window for mounting a photo or the like. This application is a Continuation-in-Part of my prior U.S. Patent Application for Process for Making a Picture Frame, Ser. No. 09/538,672, filed: Mar. 30, 2000.

In the past, it has been common to make a wide variety of picture frames. A typical picture frame is formed having an edge molding having a rectangular shape with mitered corners and having a sheet of transparent glass or plastic, such as an acrylic sheet, mounted under an edge lip on the molding. A mat is positioned under the transparent sheet of glass having a cutout center portion for mounting artwork. Usually a non-porous backing and a stiff backing are positioned behind the artwork within the frame molding. The glass, mat, artwork, and backing can be held in place within the molding using small nails or the like to hold the framed artwork together. A hanger is typically added to the frame which may consist of screw eyes on two sides of the edge molding connected by a hanging wire.

The prior art also includes the use of picture frames made out of acrylic sheets which have had screen printed images on one side of the acrylic sheet. The image is printed to form a border having a transparent center portion where the print can be mounted. This becomes very labor intensive because printing each of the colors in the design requires that the acrylic sheet be passed through the press another time. Designs can also be screen printed onto an acrylic sheet. The screen printing does not produce the fine details in the print and to obtain finer detail requires much more expensive screen printing which still does not produce the fine details produced in off-set printing. This procedure can be utilized for printing solid borders onto an acrylic sheet having a transparent center portion for mounting a picture adjacent thereto for viewing from the other side of the sheet. Decorative frames can also be made using an acrylic sheet having border artwork offset printed onto a piece of paper which is then die cut to the shaped specifications. The die cut printed paper is slid into a clear acrylic frame. This tends to look cheap and unappealing to customers and, in addition, custom dies for custom shapes increases the cost of making the plastic picture frame. In any process, it is also desirable to mount a frame easel or hanger on the back of the acrylic picture frame in order to support the picture frame on a desk or to hang the picture frame on a wall or surface.

The present process is for making a laminated acrylic picture frame having a decorative and photo border which can be made in any desired shape. The high quality and fine print detail printed on a transparent polymer sheet are laminated onto an acrylic frame without the use of expensive die charges and in a manner that small runs are economically feasible while also allowing fast and large production runs.

SUMMARY OF THE INVENTION

A process for making a picture frame includes the step of printing border art and registration marks on a piece of transparent sheet material, such as vinyl or polycarbonate plastic sheet material, while leaving a center window portion transparent. Then making a computer laser cut path for the printed transparent sheet material to mark the outside path of the border art for cutting along the edge thereof and then coating an adhesive onto the transparent sheet material, to cover the printed artwork and transparent center window. The process includes attaching the transparent sheet material having the printed border surrounding a transparent center window onto a transparent polymer picture frame member, cutting the transparent sheet of material along the computer cutout path for the outer edge of the border art to form an outer border on the transparent material and transparent picture frame member. The transparent polymer sheet is heated and folded to form a backing for the picture frame. The process can also utilize a coating of ultraviolet activated adhesive applied over the printed transparent sheet, then passing the polymer sheet having the printed border through a pair of rollers for removing air bubbles and then directing ultraviolet light through the polymer sheet onto the adhesive to activate the adhesive. The process can also include attaching a frame easel or support to the back of the picture frame.

BRIEF DESCRIPTION OF THE DRAWINGS

Other objects, features, and advantages of the present invention will be apparent from the written description and the drawings in which:

FIG. 1 is a front elevation of a laminated acrylic picture frame made in accordance with the present invention;

FIG. 2 is a side elevation of the picture frame of FIG. 1;

FIG. 4 is a side elevation of a folded easel for attaching to the picture frame of FIGS. 1 and 2.

DESCRIPTION OF THE PREFERRED EMBODIMENT

Figure 3:
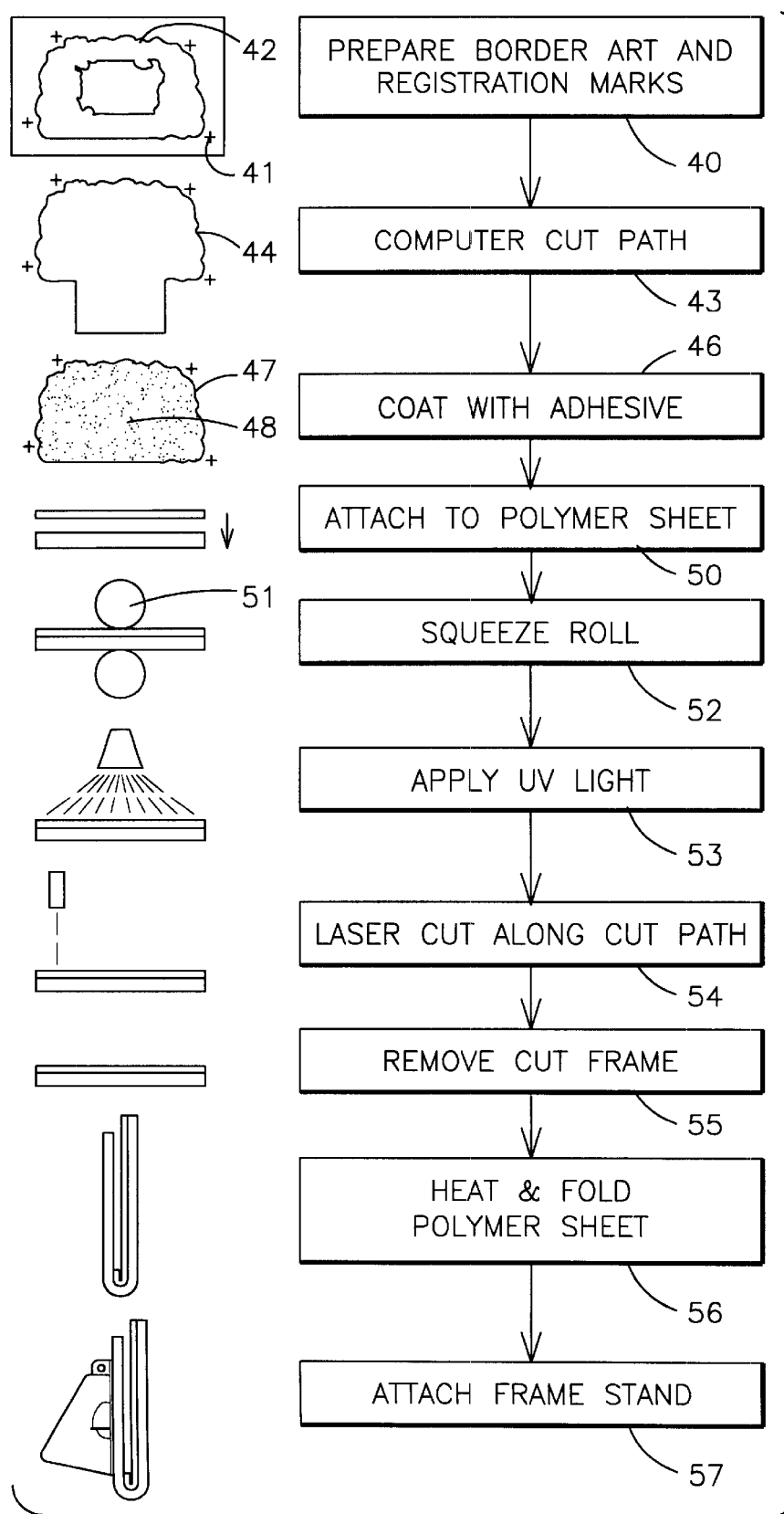
FIG. 3 is a flow diagram of the process of making a laminated acrylic picture frame in accordance with the present invention.

Referring to the drawings and especially to FIGS. 1 and 2, an acrylic picture frame 10 is illustrated having a thin transparent laminating polymer sheet 11, such as a thin sheet of vinyl or polycarbonate plastic, having an artwork border printed around an empty space 12. The printed artwork is printed directly onto one side of the polymer sheet 11 and is attached with an adhesive layer 14 to a transparent polymer picture frame member 13, such as made from an acrylic sheet of material, to position the artwork around the border of the frame 10. The artwork printed on the transparent polymer sheet 11 has an uneven edge 15 on the outside thereof and an uneven edge 16 on the inside adjacent the window area 12. The frame member 13 has been bent or folded at 17 to form a back 18 for supporting a photograph between the back 18 and the front 20 of the frame member 13. The printed design on the transparent polymer sheet 11 is adhesively attached or laminated to the rear of the front portion of the picture frame 10. Picture frame 10, in accordance with FIGS. 1 and 2, has an easel 21, as seen in FIG. 4, attached to the rear picture holding portion 18. The easel 21 has been die cut to a predetermined shape and has an adhesive coating over edge 22 covered with an adhesive cover 23, such as a wax paper or the like, which is peeled off for attaching to a frame. The easel has an aperture 24 therethrough above a perforated line 25, such that the top portion 26 can be broken along the perforated edge 25 and the adhesive on that portion attached to the rear 18 of the frame 10 for attaching the frame to a wall. The remaining portion of the flat easel 21 can have the paper covering 23 removed and can be attached directly to the backside of the picture supporting back 18. The easel supporting leg 27 can be folded on the fold line 28 to rotate 90° to the fixed portion 30 of the easel support 21. The easel leg latch 31 can be folded on the fold line 32 to a 90° position so that when the easel support leg 27 is rotated along the curved surface 33, the latching notch 34 will slide into the latching notch 35 of the easel support leg 27 to hold the easel in an extended position approximately 90° from the back 18 of the frame 10.

Turning to FIG. 3, the process of making the picture frame 10, as shown in FIGS. 1 and 2, is illustrated in which the border art is first prepared (40) complete with registration marks 41 on the artwork 42 on the transparent polymer sheet 11. Next, a digital cut path is created (43) for a C-N-C laser. The cut path follows the edges 44 for later cutting the outer edge of the frame. The digital artwork is then printed onto the transparent polymer sheet 11 surface to form a photo design border for the picture frame 10. The transparent polymer sheet 11 is then coated (46) with an adhesive 47 on the front thereof including covering both the printed image and the transparent window area 48 with the adhesive. A clear ultraviolet curable adhesive is utilized and is applied over the entire surface of the transparent polymer sheet that is to be attached to the frame, including the area having the printed image thereon and the window area 48. The adhesive can be applied by screen printing the adhesive onto the transparent polymer sheet over the printed area and window area and will cure transparent. A sheet of acrylic is precut to the appropriate size and has the polymer laminating sheet having the image border printed thereon and which has been coated with an adhesive for attaching the laminating printed polymer sheet to the frame member (50). The acrylic frame member has the printed laminating sheet attached thereto and is fed between a pair of pressure rollers (51) to squeeze roll (52) the printed laminating sheet onto the acrylic frame member to thereby squeeze out air bubbles and to evenly adhere the printed laminating sheet to the acrylic frame member. Both rollers are powered to prevent the printed laminating sheet and the acrylic frame member from being skewed during the lamination process. The top roller has dual air pressure adjustments for even pressure. Both rollers are rubber coated. The adhesive coated transparent laminating sheet, which has now been laminated onto the acrylic frame member, and which has had the bubbles removed with the squeeze rollers, is passed under UV lamps (53) through the transparent side of the acrylic frame member to cure the adhesive. The laminating sheet with the printed border image thereon has the UV adhesive cured to give a laminated sheet on the acrylic frame member having a transparent window area for mounting a picture for display.

The laminating sheet and frame member are then positioned on a C-N-C driven laser table and registered with cross hair lasers mounted overhead so that a cutting laser can cut along the computer cut path lines 44 to cut the laminating sheet and attached frame member. The cut path is generated in a computer and stored in a digital file so that once the frame is aligned, the laser then cuts a path 54 along the computer driven cut path for the printed sheet design. The printed border image is printed directly on the transparent laminating sheet. Only the exterior edge of the frame along the printed border has to be cut since the picture window area (48) is covered with the transparent laminating sheet and does not need to be cut out to leave a clear window in the middle of the laminated frame, such as the clear window area 12 of the frame of FIG. 1. The cutout exterior edges are removed in step 55. The polymer is then heated and folded (56) at the bend area 17 of FIG. 2 so that the one sheet of acrylic polymer forms both the frame and the backing for holding the picture within the frame. An easel stand is attached (57), such as the easel stand in FIG. 4, to the back 18 of the acrylic polymer sheet. The easel stand 21 of FIG. 4 is mounted flat to the back so that the entire frame can be shipped flat before the easel stand 21 is opened for supporting the frame on a flat surface.

It should be clear at this time that a process of making a laminated acrylic picture frame having a high quality printed border which may have a very irregular inside and outside shape to the border has been provided. It should, however, also be clear that the present invention is not to be limited to the forms shown which are to be considered illustrative rather than restrictive.

I claim:

1. A process for making a picture frame comprising the steps of:

printing border art work and registration marks on a transparent sheet leaving a transparent center window;

making an outer cut path for said printed transparent sheet;

coating an adhesive onto said printed transparent sheet;

attaching said printed transparent sheet to a transparent polymer frame member; and cutting said printed transparent sheet and transparent polymer frame member along said outer cut path to form an exterior border edge in said printed transparent sheet and transparent polymer frame member; whereby a picture frame is made from a transparent polymer frame having printed border artwork thereon and having a center transparent picture holding window.

2. The process for making a picture frame in accordance with claim 1 including the step of heating an elongated area on said transparent polymer frame member and folding said transparent polymer member to form a picture holding back on said picture frame.

3. The process for making a picture frame in accordance with claim 2 in which the step of coating an adhesive includes coating an ultra-violet activated adhesive onto said transparent printed sheet over said printed artwork and transparent center window.

4. The process for making a picture frame in accordance with claim 2 in which the step of coating an adhesive includes coating a heat activated adhesive onto said transparent printed sheet over said printed artwork and transparent center window.

5. The process for making a picture frame in accordance with claim 2 including the step of passing said transparent polymer frame member having said transparent printed sheet attached thereto through a pair of powered rollers for removing air bubbles from between said transparent printed sheet and said transparent polymer frame member.

6. The process for making a picture frame in accordance with claim 3 including the step of applying ultra-violet light through said transparent polymer frame member onto said adhesive to activate said adhesive.

7. The process for making a picture frame in accordance with claim 1 in which the step of making an outer cut path includes making a computer generated cut path.

8. The process for making a picture frame in accordance with claim 2 including the step of attaching an frame easel to said picture holding back.

9. The process for making a picture frame in accordance with claim 7 in which the step of making a cut-path includes making an irregular cut-path along the outer edge of said picture frame.

10. The process for making a picture frame in accordance with claim 9 including the step of laser cutting an outer border of said transparent polymer frame member and transparent printed sheet.

11. The process for making a picture frame in accordance with claim 1 in which said transparent polymer frame member is an acrylic polymer sheet member.

* * * * *